(12) United States Patent
Kimura et al.

(10) Patent No.: US 11,657,997 B2
(45) Date of Patent: May 23, 2023

(54) ELECTRON-EMITTING ELEMENT (71) Applicant: KABUSHIKI KAISHA TOSHIBA, Tokyo (JP)

(72) Inventors: Shigeya Kimura, Yokohama (JP); Hisashi Yoshida, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 462 days.

(21) Appl. No.: 17/015,561

(22) Filed: Sep. 9, 2020

(65) Prior Publication Data

US 2021/0142973 A1 May 13, 2021

(30) Foreign Application Priority Data

Nov. 12, 2019 (JP) .............................. JP2019-204811

(51) Int. Cl.
*H01J 1/34* (2006.01)
*C01B 32/25* (2017.01)

(52) U.S. Cl.
CPC ............... *H01J 1/34* (2013.01); *C01B 32/25* (2017.08); *C01P 2002/52* (2013.01); *C01P 2006/40* (2013.01); *H01J 2201/3423* (2013.01)

(58) Field of Classification Search
CPC ................ H01J 1/34; H01J 2201/3423; H01J 2201/3421

(Continued)

(56) References Cited

U.S. PATENT DOCUMENTS 5,898,269 A 4/1999 Baum et al.
5,982,094 A 11/1999 Niigaki et al.
(Continued)

FOREIGN PATENT DOCUMENTS

JP 10-149761 A 6/1998
JP 2000-357449 A 12/2000
(Continued)

OTHER PUBLICATIONS

Marini, J. et al., "Polarization engineered N-polar Cs-free GaN photocathodes," Journal of Applied Physics, vol. 124, No. 113101, 2018, 9 pages.

*Primary Examiner* — Christopher M Raabe
(74) *Attorney, Agent, or Firm* — Oblon, McClelland, Maier & Neustadt, L.L.P.

(57) ABSTRACT

According to one embodiment, an electron-emitting element includes a first member and a second member. The first member includes a semiconductor member of an n-type. The second member includes a diamond member a p-type and includes at least one selected from the group consisting of diamond and graphite. The semiconductor member includes at least one selected from the group consisting of a first material, a second material, and a third material. The first material includes nitrogen and at least one selected from the group consisting of B, Al, In, and Ga. The second material includes at least one selected from the group consisting of ZnO and ZnMgO. The third material includes at least one selected from the group consisting of $BaTiO_3$, $PbTiO_3$, $Pb(Zr_x, Ti_{1-x})O_3$, $KNbO_3$, $LiNbO_3$, $LiTaO_3$, $Na_xWO_3$, $Zn_2O_3$, $Ba_2NaNb_5O_5$, $Pb_2KNb_5O_{15}$, and $Li_2B_4O_7$.

20 Claims, 7 Drawing Sheets

(58) Field of Classification Search
USPC .......................................................... 257/11
See application file for complete search history.

(56) References Cited

U.S. PATENT DOCUMENTS

| | | | |
|---|---|---|---|
| 6,316,873 B1 * | 11/2001 | Ito | H01J 1/312 |
| | | | 313/496 |
| 6,396,049 B1 | 5/2002 | Estrera et al. | |
| 6,759,800 B1 | 7/2004 | Fernandez et al. | |
| 8,710,523 B2 * | 4/2014 | Slutsky | H05K 1/053 |
| | | | 257/E33.001 |
| 10,403,718 B2 * | 9/2019 | Huang | H01L 29/0847 |
| 2005/0174052 A1 | 8/2005 | Niigaki et al. | |

FOREIGN PATENT DOCUMENTS

| | | | |
|---|---|---|---|
| JP | 2002-500809 A | | 1/2002 |
| JP | 2003-523048 A | | 7/2003 |
| JP | 2003-249164 A | | 9/2003 |
| JP | 2003-529183 A | | 9/2003 |
| JP | 3580973 B2 | | 10/2004 |
| JP | 3642664 B2 | | 4/2005 |
| JP | 3762535 B2 | | 4/2006 |
| JP | 3768658 B2 | | 4/2006 |
| JP | 2007-80697 A | | 3/2007 |
| JP | 4166990 B2 | | 10/2008 |
| JP | 2009-252413 A | | 10/2009 |
| JP | 2010-67452 A | | 3/2010 |
| JP | 2017084505 A | * | 5/2017 |

* cited by examiner

ELECTRON-EMITTING ELEMENT

CROSS-REFERENCE TO RELATED APPLICATIONS

This application is based upon and claims the benefit of priority from Japanese Patent Application No. 2019-204811, filed on Nov. 12, 2019; the entire contents of which are incorporated herein by reference.

FIELD

Embodiments of the invention generally relate to an electron-emitting element.

BACKGROUND

For example, there is an electron-emitting element that emits electrons based on incident light. It is desirable to increase the efficiency of the electron-emitting element.

DETAILED DESCRIPTION

According to one embodiment, an electron-emitting element includes a first member and a second member. The first member includes a semiconductor member of an n-type. The second member includes a diamond member a p-type and includes at least one selected from the group consisting of diamond and graphite. The semiconductor member includes at least one selected from the group consisting of a first material, a second material, and a third material. The first material includes nitrogen and at least one selected from the group consisting of B, Al, In, and Ga. The second material includes at least one selected from the group consisting of ZnO and ZnMgO. The third material includes at least one selected from the group consisting of $BaTiO_3$, $PbTiO_3$, $Pb(Zr_x, Ti_{1-x})O_3$, $KNbO_3$, $LiNbO_3$, $LiTaO_3$, $Na_xWO_3$, $Zn_2O_3$, $Ba_2NaNb_5O_5$, $Pb_2KNb_5O_{15}$, and $Li_2B_4O_7$.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

Figure 1:
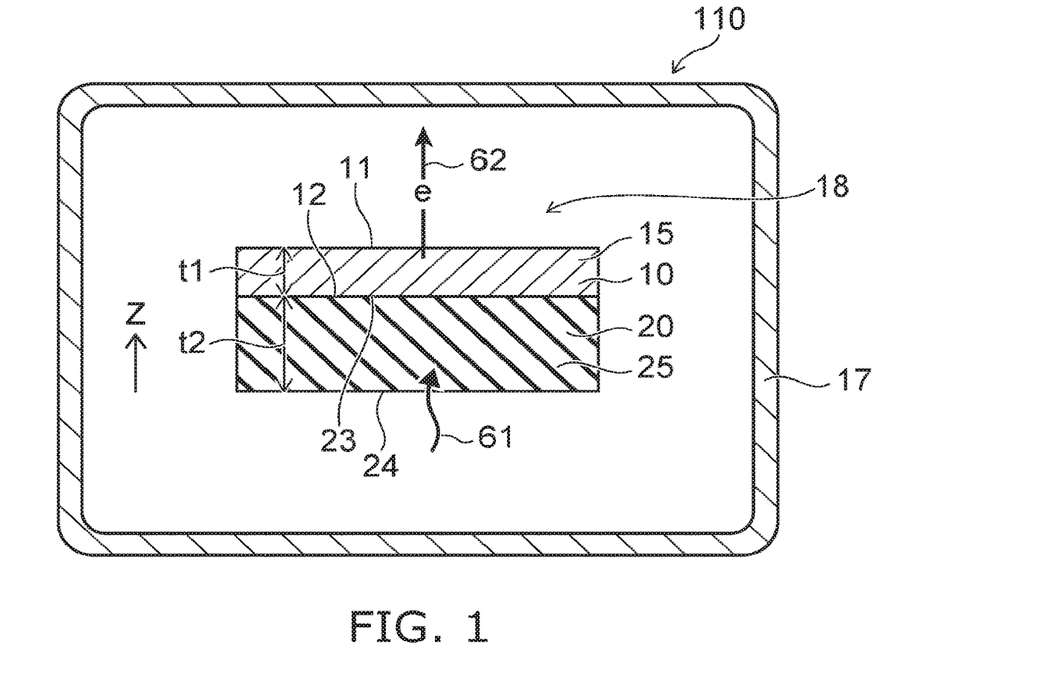
FIG. 1 is a schematic cross-sectional view illustrating an electron-emitting element according to a first embodiment.

FIG. 1 is a schematic cross-sectional view illustrating an electron-emitting element according to a first embodiment.

As shown in FIG. 1, the electron-emitting element 110 according to the embodiment includes a first member 10 and a second member 20. For example, the first member 10 and the second member 20 are provided inside a container 17. For example, the space inside the container 17 can be maintained in a reduced-pressure state. The space inside the container 17 may include, for example, a gas including at least one selected from the group consisting of helium, neon, argon, krypton, xenon, and radon. The electron-emitting element 110 may include the container 17.

The first member 10 includes an n-type semiconductor member 15. The second member 20 includes a p-type diamond member 25. The diamond member 25 includes at least one selected from the group consisting of diamond and graphite. For example, the diamond member 25 that is included in the second member 20 includes at least one first element selected from the group consisting of B and Al.

The semiconductor member 15 includes at least one selected from the group consisting of a first material, a second material, and a third material. The first material includes nitrogen and at least one selected from the group consisting of B, Al, In, and Ga. For example, the first material includes AlGaN. The second material includes at least one selected from the group consisting of ZnO and ZnMgO. The third material includes at least one selected from the group consisting of $BaTiO_3$, $PbTiO_3$, $Pb(Zr_x, Ti_{1-x})O_3$, $KNbO_3$, $LiNbO_3$, $LiTaO_3$, $Na_xWO_3$, $Zn_2O_3$, $Ba_2NaNb_5O_5$, $Pb_2KNb_5O_{15}$, and $Li_2B_4O_7$. For example, the semiconductor member 15 has polarization.

For example, light 61 is incident on the electron-emitting element 110. The electron-emitting element 110 emits electrons 62 according to the light 61 that is incident. For example, the peak wavelength of the light 61 is 300 nm or less. For example, the peak wavelength of the light 61 may be 210 nm or less.

For example, the electrons 62 are emitted from a surface of the first member 10. For example, the first member 10 includes a first surface 11 and a second surface 12. The second surface 12 is between the second member 20 and the first surface 11. For example, the electrons 62 are emitted from the first surface 11.

For example, the second member 20 includes a third surface 23 and a fourth surface 24. The third surface 23 is between the fourth surface 24 and the first member 10. In the example of FIG. 1, the light 61 enters the second member 20 from the fourth surface 24. The electrons 62 that correspond to the light 61 are emitted from the first surface 11.

In the embodiment, for example, a wide bandgap p-type diamond member 25 is used. Movable electrons that are generated by the incident light 61 can be efficiently emitted from the surface of the first member 10 into an outer region 18. The outer region 18 is outside the first member 10 and inside the container 17. According to the embodiment, an electron-emitting element can be provided in which the efficiency can be increased. The electron-emitting element 110 is, for example, a photocathode.

For example, in a photocathode of a first reference example, a diamond surface is terminated with hydrogen. Electrons are emitted from the surface. In the first reference example, there is a possibility that the hydrogen of the surface may desorb. Therefore, it is difficult to stably emit the electrons. The life of the first reference example is short.

For example, in a photocathode of a second reference example, a GaN layer that includes, for example, Cs or the like is used. In the second reference example, there is a possibility that the Cs may desorb. Therefore, it is difficult to stably emit the electrons.

For example, in a photocathode of a third reference example, a p-type AlGaN layer and an n-type GaN layer are combined. It is difficult to practically introduce a high concentration of a p-type impurity (e.g., Mg, etc.) into AlGaN, which has a high Al composition ratio. It is difficult to manufacture the structure of the third reference example.

Conversely, in the embodiment, for example, the p-type diamond member 25 and the semiconductor member 15, which is n-type AlGaN or the like, are used. Stable characteristics are obtained because hydrogen termination, Cs, etc., are not included. The life of the electron-emitting element according to the embodiment is long. The manufacturing is easy because a p-type AlGaN layer or the like is not used. The diamond member 25 can include a high concentration of the first element, which is a p-type impurity.

In the embodiment, for example, the difference between the band energies of the semiconductor member 15 and the diamond member 25 can be large. For example, the energy of the semiconductor member 15 can be set to approach the energy of the outer region 18 or to be greater than the energy of the outer region 18. Thereby, electrons can be emitted from the semiconductor member 15 into the outer region 18 with high efficiency.

As shown in FIG. 1, the direction from the second member 20 toward the first member 10 is taken as a first direction (a Z-axis direction). A thickness t1 of the first member 10 along the first direction is, for example, 10 nm or less. Due to such a thickness, the electrons 62 are emitted with high efficiency. As described below, the first member 10 may have an island configuration.

A thickness t2 of the second member 20 along the first direction (the Z-axis direction) is, for example, not less than 10 nm and not more than 1 mm. As described below, when the second member 20 is supported by the base body, the thickness t2 of the second member 20 may be 30 nm or less.

Figure 2:
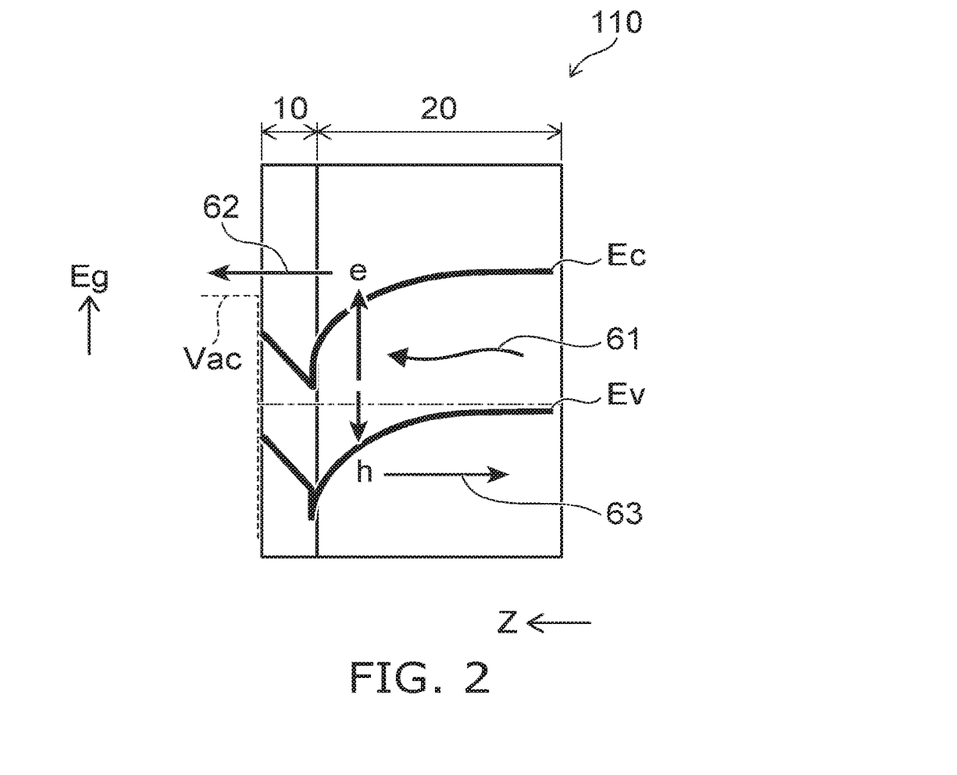
FIG. 2 is a schematic view illustrating the electron-emitting element according to the first embodiment.

FIG. 2 is a schematic view illustrating the electron-emitting element according to the first embodiment.

FIG. 2 illustrates profiles of the energy bands of the electron-emitting element 110. The horizontal axis of FIG. 2 is the Z-axis direction. The vertical axis is an energy Eg. FIG. 2 shows an energy Ev of the valence band and an energy Ec of the conduction band. As shown in FIG. 2, the energy Ev and the energy Ec of the second member 20 have large bends at the vicinity of the interface between the first member 10 and the second member 20. When the light 61 is incident, the electrons 62 can efficiently move in the orientation from the second member 20 toward the first member 10. For example, the electrons 62 overcome an energy level Vac of the outer region 18 and are emitted from the first member 10 into the outer region 18. Holes 63 move in the orientation from the first member 10 toward the second member 20. In the embodiment, the electrons can be emitted with high efficiency.

In the embodiment, the first member 10 may include a polycrystal. For example, the semiconductor member 15 may include a polycrystal of at least one selected from the group consisting of the first material, the second material, and the third material. For example, it is easy to manufacture the semiconductor member 15. For example, the semiconductor member 15 and the first member 10 may be formed by a method such as MOCVD (Metal Organic Chemical Vapor Deposition), MBE (Molecular Beam Epitaxy), sputtering, CVD (Chemical Vapor Deposition), PLD (Physical Vapor Deposition), ALD (Atomic Layer Deposition), etc.

In the embodiment, the second member 20 may include a polycrystal of diamond. The second member 20 may include graphite. Thereby, it is easier to manufacture the second member 20.

In the electron-emitting element 110, the second member 20 contacts the first member 10. As described below, another member may be provided between the second member 20 and the first member 10.

In the embodiment, when the semiconductor member 15 includes the first material (AlGaN, etc.) described above, the concentration of the n-type impurity in the semiconductor member 15 is, for example, not less than $1 \times 10^{16}/cm^3$ and not more than $5 \times 10^{19}/cm^3$. Due to such a concentration, the electrons are emitted with a particularly high efficiency.

In the embodiment, it is favorable for the semiconductor member 15 to include the first material (AlGaN) described above. Thereby, for example, a large polarization is obtained. For example, a high n-type carrier concentration is obtained by the semiconductor member 15 including the first material described above. High efficiency is easily obtained.

In the embodiment, it is favorable for the semiconductor member 15 to include the second material (at least one selected from the group consisting of ZnO and ZnMgO) described above. For example, a large polarization is obtained thereby. For example, a high n-type carrier concentration is obtained by the semiconductor member 15 including the second material described above. High efficiency is easily obtained.

Figure 3:
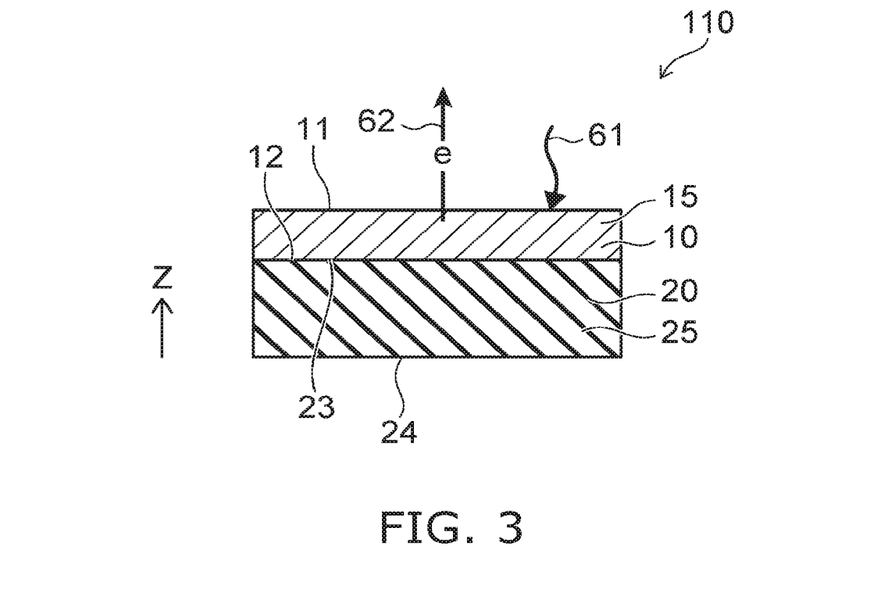
FIG. 3 is a schematic cross-sectional view illustrating the electron-emitting element according to the first embodiment.

FIG. 3 is a schematic cross-sectional view illustrating the electron-emitting element according to the first embodiment.

In the electron-emitting element 110 as shown in FIG. 3, the light 61 may enter the second member 20 from the first surface 11. In such a case as well, the electrons 62 that correspond to the light 61 are emitted from the first surface 11. The container 17 is not illustrated in FIG. 3.

Figure 4:
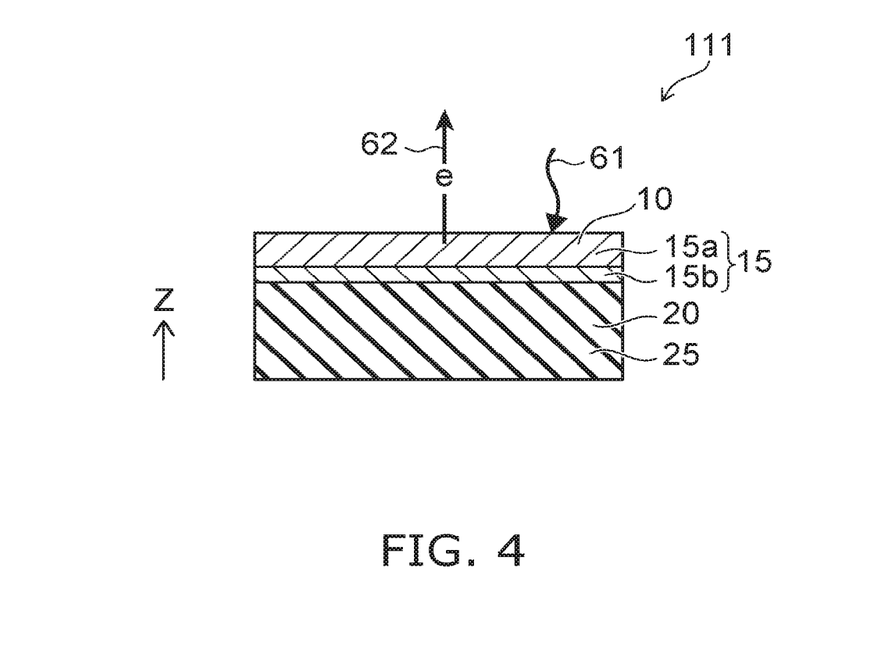
FIG. 4 is a schematic cross-sectional view illustrating an electron-emitting element according to the first embodiment.

FIG. 4 is a schematic cross-sectional view illustrating an electron-emitting element according to the first embodiment.

In the electron-emitting element 111 according to the embodiment as shown in FIG. 4, the semiconductor member 15 includes nitrogen and at least one selected from the group consisting of Al and Ga. The semiconductor member 15 includes, for example, AlGaN or AlN.

The semiconductor member 15 includes a first region 15a and a second region 15b. The second region 15b is between the second member 20 and the first region 15a. The composition ratio of Al in the second region 15b is greater than the composition ratio of Al in the first region 15a. For example, the first region 15a is n-type AlGaN. For example, the second region 15b is n-type AlN. The boundary between the first region 15a and the second region 15b may be distinct or indistinct.

Figure 5:
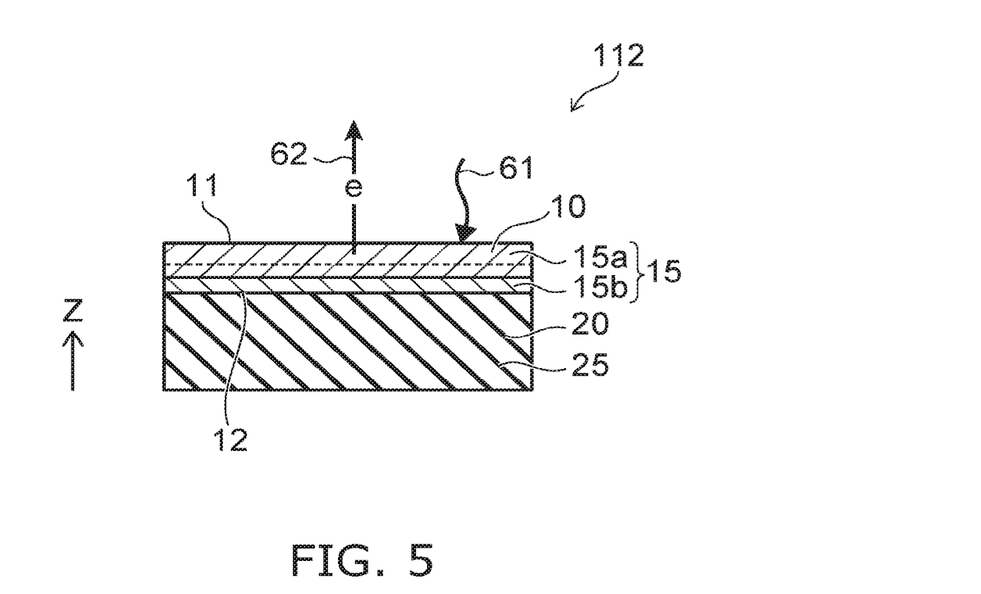
FIG. 5 is a schematic cross-sectional view illustrating an electron-emitting element according to the first embodiment.

FIG. 5 is a schematic cross-sectional view illustrating an electron-emitting element according to the first embodiment.

In the electron-emitting element 112 according to the embodiment as shown in FIG. 5, the semiconductor member 15 includes nitrogen and at least one selected from the group consisting of Al and Ga. The semiconductor member 15 includes the first region 15a and the second region 15b. The Al composition ratio in the semiconductor member 15 may decrease in stages or continuously in the orientation from the second surface 12 toward the first surface 11.

In the electron-emitting elements 111 and 112, for example, the depletion region that is formed between the semiconductor member 15 and the diamond member 25 can be reduced.

Figure 6:
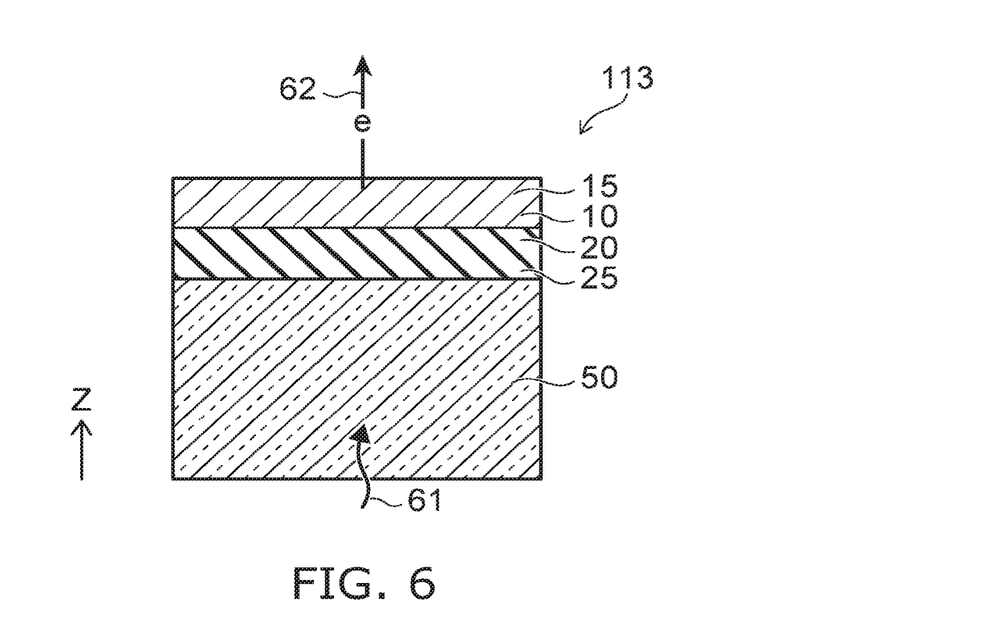
FIG. 6 is a schematic cross-sectional view illustrating an electron-emitting element according to the first embodiment.

FIG. 6 is a schematic cross-sectional view illustrating an electron-emitting element according to the first embodiment.

As shown in FIG. 6, the electron-emitting element 113 according to the embodiment includes a base body 50 in addition to the first and second members 10 and 20. The second member 20 is provided between the base body 50 and the first member 10. The base body 50 is, for example, a substrate.

The thickness (the length along the Z-axis direction) of the base body 50 is, for example, not less than 5 nm and not more than 1000 μm. The base body 50 can support the second member 20 and the first member 10. When the base body 50 is provided, the thickness of the second member 20 may be, for example, 30 nm or less. A stable second member 20 is easily obtained because the second member 20 is supported by the base body 50. The second member 20 can be inexpensively obtained.

The base body 50 may be light-transmissive. For example, the light 61 can enter the second member 20 via the base body 50. The base body 50 includes, for example, at least one selected from the group consisting of $Al_2O_3$, AlN, GaN, and MgO, etc.

Figure 7:
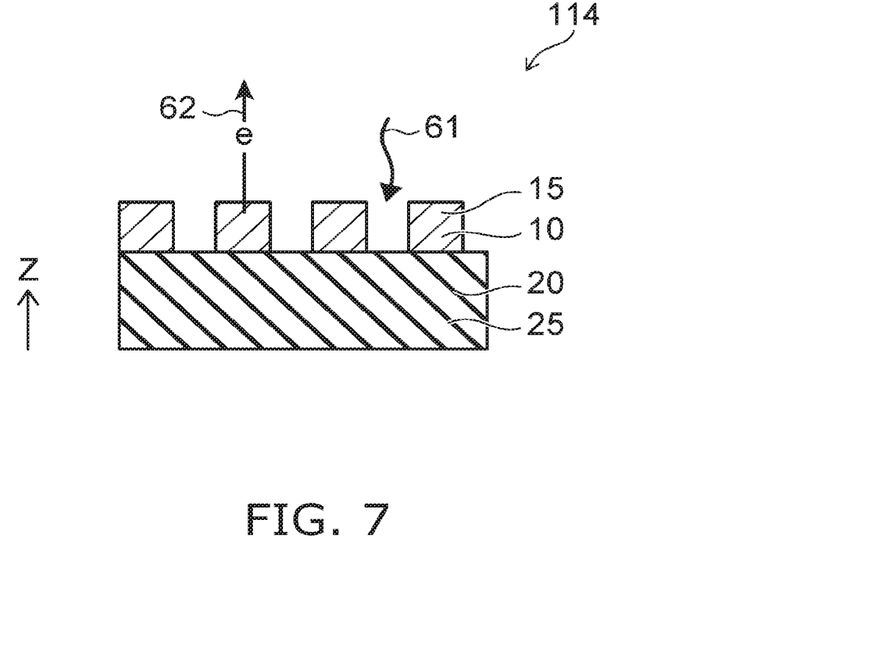
FIG. 7 is a schematic cross-sectional view illustrating an electron-emitting element according to the first embodiment.

FIG. 7 is a schematic cross-sectional view illustrating an electron-emitting element according to the first embodiment.

In the electron-emitting element 114 according to the embodiment as shown in FIG. 7, the first member 10 has an island configuration. For example, the surface of the second member 20 may be exposed between the first member 10 that has multiple island shapes. In the electron-emitting element 114, a stable first member 10 can be easily obtained. For example, a low-cost first member 10 can be obtained.

Figure 8:
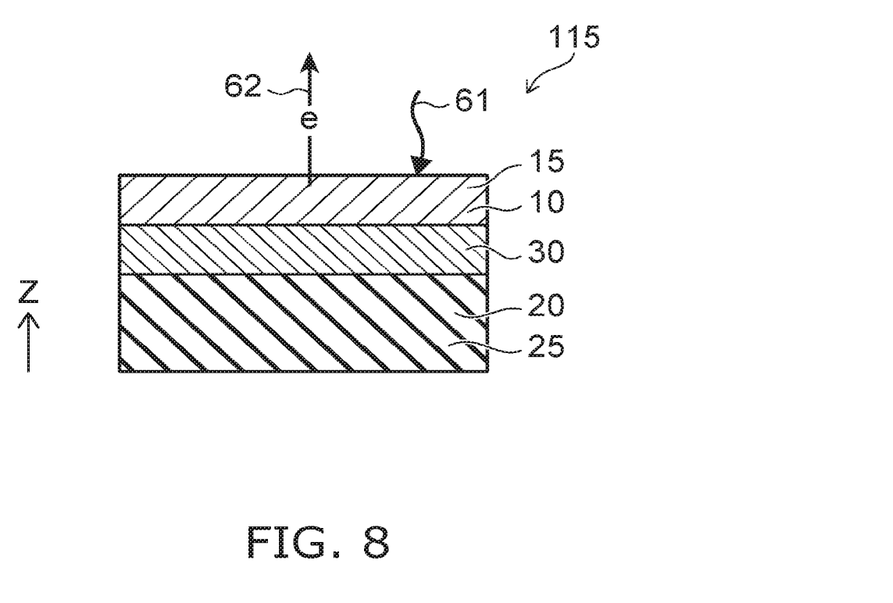
FIG. 8 is a schematic cross-sectional view illustrating an electron-emitting element according to the first embodiment.

FIG. 8 is a schematic cross-sectional view illustrating an electron-emitting element according to the first embodiment.

As shown in FIG. 8, the electron-emitting element 115 according to the embodiment includes a third member 30 in addition to the first and second members 10 and 20. The third member 30 is provided between the second member 20 and the first member 10. The third member 30 includes, for example, SiC. The SiC is of the p-type. In the electron-emitting element 115, for example, light of a long wavelength up to about 400 nm can be absorbed, and an electron emission can be obtained.

The thickness in the Z-axis direction of the third member 30 (SiC) is, for example, not less than 5 nm and not more than 100 nm. When the thickness is 5 nm or more, for example, it is easier to absorb long-wavelength light up to about 400 nm. When the thickness is 100 nm or less, for example, it is easier to transport the electrons from the second member 20 into the first member 10.

Figure 9:
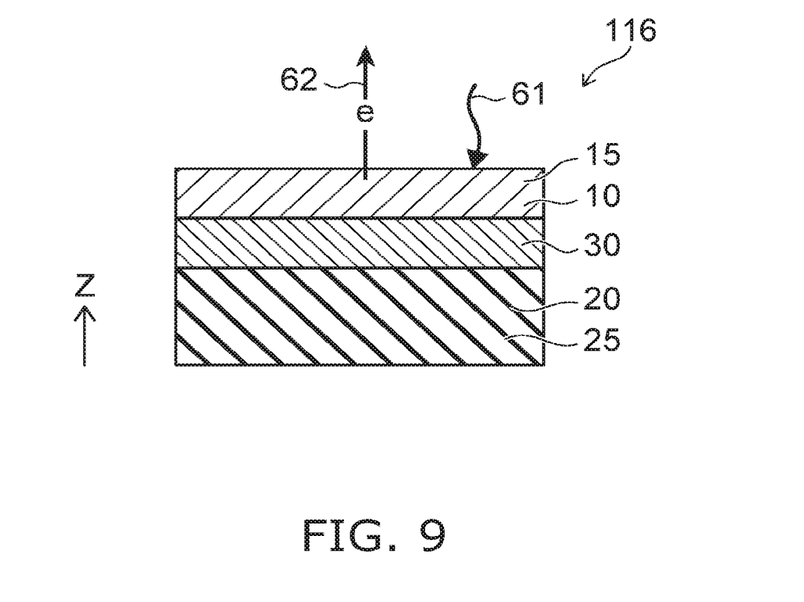
FIG. 9 is a schematic cross-sectional view illustrating an electron-emitting element according to the first embodiment.

FIG. 9 is a schematic cross-sectional view illustrating an electron-emitting element according to the first embodiment.

As shown in FIG. 9, the electron-emitting element 116 according to the embodiment includes the third member 30 in addition to the first and second members 10 and 20. The third member 30 is provided between the second member 20 and the first member 10.

In the electron-emitting element 116, the semiconductor member 15 that is included in the first member 10 includes nitrogen and at least one selected from the group consisting of Al and Ga. The semiconductor member 15 includes, for example, n-type AlGaN.

The third member 30 includes, for example, In, Ga, and nitrogen. The third member 30 includes, for example, InGaN. The InGaN is, for example, of the p-type. In the electron-emitting element 116, for example, visible light also can be absorbed, and electron emission can be obtained.

In the electron-emitting element 116, the thickness in the Z-axis direction of the third member 30 (e.g., p-type InGaN) is, for example, not less than 5 nm and not more than 100 nm. For example, visible light is easier to absorb when the thickness is 5 nm or more. For example, the crystallinity of the third member 30 is easier to maintain when the thickness is 100 nm or less.

Second Embodiment

Figure 10:
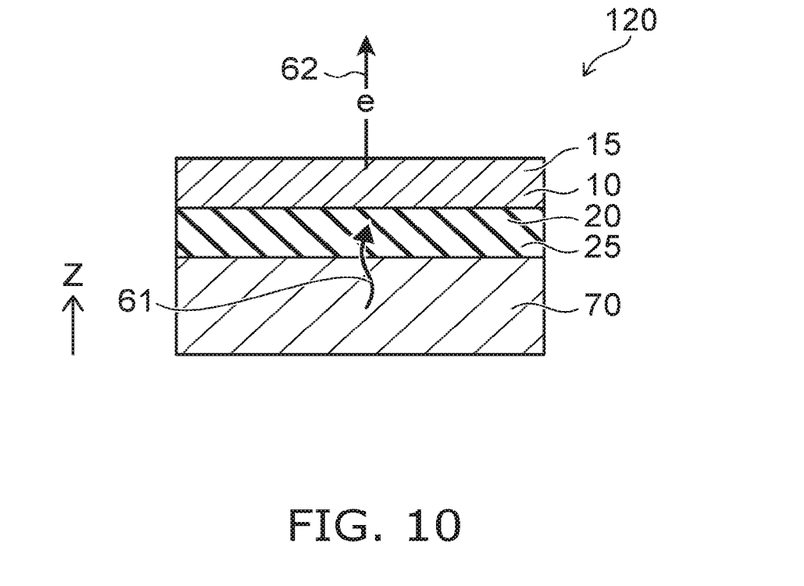
FIG. 10 is a schematic cross-sectional view illustrating an electron-emitting element according to a second embodiment.

FIG. 10 is a schematic cross-sectional view illustrating an electron-emitting element according to a second embodiment.

As shown in FIG. 10, the electron-emitting element 120 according to the embodiment further includes a light emitter 70 in addition to the first and second members 10 and 20. The second member 20 is provided between the light emitter 70 and the first member 10.

The light 61 is emitted from the light emitter 70. The light 61 enters the second member 20. The electrons 62 that correspond to the light 61 are emitted from the first member 10. For example, the light emitter 70 can emit the light 61 with the desired intensity at the desired timing. For example, the desired amount of electrons can be emitted from the first member 10 at the desired timing.

The light emitter 70 includes, for example, an LED (Light Emitting Diode) or a LD (Laser Diode).

Figure 11:
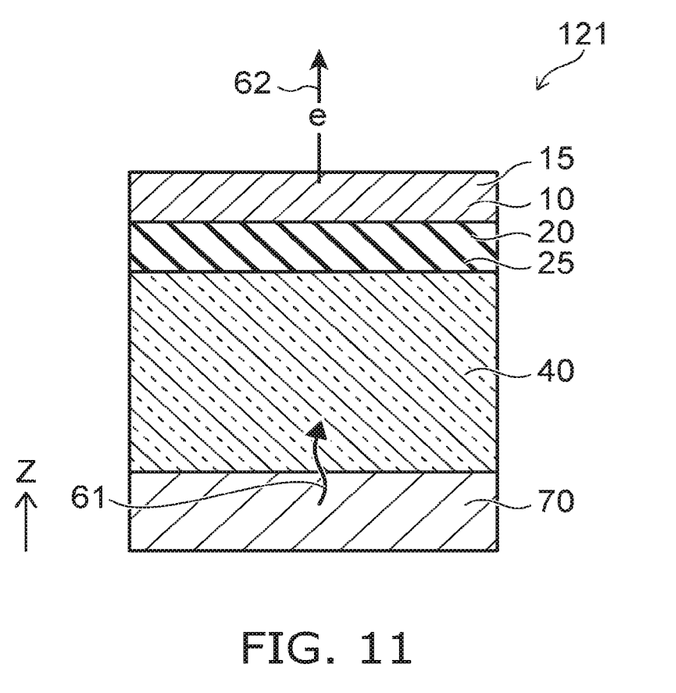
FIG. 11 is a schematic cross-sectional view illustrating an electron-emitting element according to the second embodiment.

FIG. 11 is a schematic cross-sectional view illustrating an electron-emitting element according to the second embodiment. As shown in FIG. 11, the electron-emitting element 121 according to the embodiment further includes a fourth member 40 in addition to the first member 10, the second member 20, and the light emitter 70. The fourth member 40 is between the light emitter 70 and the second member 20. For example, the fourth member 40 may function as a base body. For example, the fourth member 40 may support the second member 20 and the first member 10.

The fourth member 40 is, for example, light-transmissive. The light 61 that is emitted from the light emitter 70 passes through the fourth member 40 and enters the second member 20. The electrons 62 that correspond to the light 61 are emitted from the first member 10. In the electron-emitting element 121, the fourth member 40 includes, for example, at least one selected from the group consisting of $Al_2O_3$, AlN, GaN, and MgO, etc.

Figure 12:
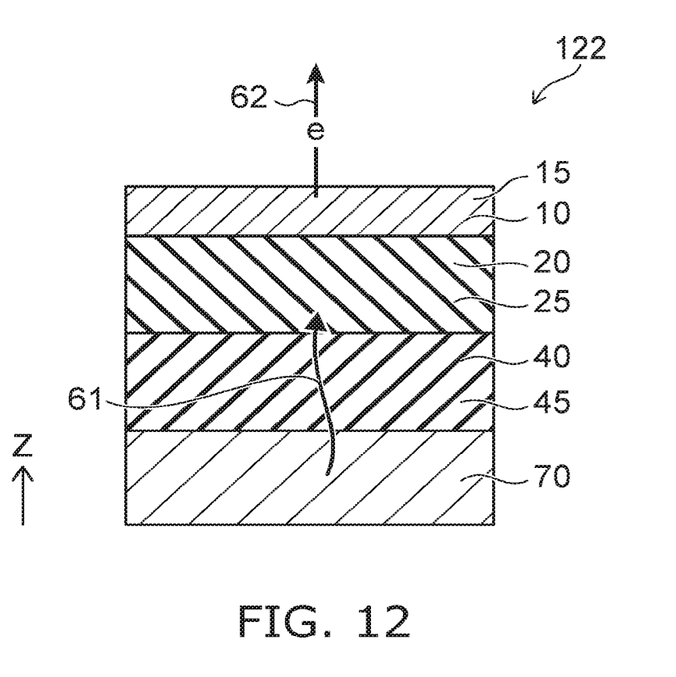
FIG. 12 is a schematic cross-sectional view illustrating an electron-emitting element according to the second embodiment.

FIG. 12 is a schematic cross-sectional view illustrating an electron-emitting element according to the second embodiment.

As shown in FIG. 12, the electron-emitting element 122 according to the embodiment further includes the fourth member 40 in addition to the first member 10, the second member 20, and the light emitter 70. The fourth member 40 is between the light emitter 70 and the second member 20.

In the electron-emitting element 122, the fourth member 40 includes at least one selected from the group consisting of diamond and graphite (e.g., a diamond member 45). The concentration of the impurity in the diamond member 45 of the fourth member 40 is less than the concentration of the impurity included in the diamond member 25 of the second member 20.

For example, the diamond member 25 that is included in the second member 20 includes at least one first element selected from the group consisting of B and Al. In one example, the diamond member 45 that is included in the fourth member 40 does not include the first element. In another example, the concentration of the first element in the diamond member 45 included in the fourth member 40 is less than the concentration of the first element in the diamond member 25 included in the second member 20. In the electron-emitting element 122, for example, high-quality diamond members 25 and 45 are obtained.

In the electron-emitting element 122, the thickness in the Z-axis direction of the fourth member 40 is, for example, not less than 5 nm and not more than 1 mm. When the thickness is 5 nm or more, for example, it is easier to electrically insulate the light emitter 70 and the diamond member 25 from each other. When the thickness is 1 mm or less, for example, patterning such as dicing (separation) and the like are easier.

Third Embodiment

Figure 13:
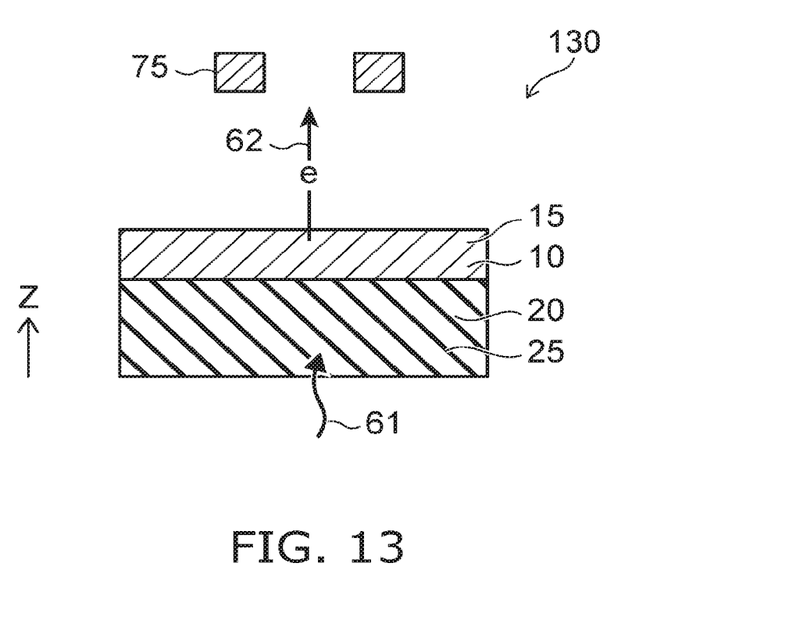
FIG. 13 is a schematic cross-sectional view illustrating an electron-emitting element according to a third embodiment.

FIG. 13 is a schematic cross-sectional view illustrating an electron-emitting element according to a third embodiment.

As shown in FIG. 13, the electron-emitting element 130 according to the embodiment further includes an electrode 75 in addition to the first and second members 10 and 20. For example, the electrons 62 that are emitted from the first member 10 can be easier to read by controlling the potential of the electrode 75. The electrons 62 can be accelerated by controlling the potential of the electrode 75. The electrode 75 can be provided in any configuration according to the first or second embodiment.

The container 17 is not illustrated in FIGS. 4 to 13. The electron-emitting elements 111 to 116, 120 to 122, and 130 may include the container 17.

The embodiments may include the following configurations (e.g., technological proposals).

Configuration 1
An electron-emitting element, comprising:
a first member including a semiconductor member, the semiconductor member being of an n-type; and
a second member including a diamond member, the diamond member being of a p-type and including at least one selected from the group consisting of diamond and graphite,
the semiconductor member including at least one selected from the group consisting of a first material, a second material, and a third material,
the first material including nitrogen and at least one selected from the group consisting of B, Al, In, and Ga,
the second material including at least one selected from the group consisting of ZnO and ZnMgO,
the third material including at least one selected from the group consisting of $BaTiO_3$, $PbTiO_3$, $Pb(Zr_x, Ti_{1-x})O_3$, $KNbO_3$, $LiNbO_3$, $LiTaO_3$, $Na_xWO_3$, $Zn_2O_3$, $Ba_2NaNb_5O_5$, $Pb_2KNb_5O_{15}$, and $Li_2B_4O_7$.

Configuration 2
The electron-emitting element according to Configuration 1, wherein
electrons are emitted according to incident light.

Configuration 3
The electron-emitting element according to Configuration 2, wherein
a peak wavelength of the light is 300 nm or less.

Configuration 4
The electron-emitting element according to Configuration 2, wherein
a peak wavelength of the light is 210 nm or less.

Configuration 5
The electron-emitting element according to any one of Configurations 2 to 4, wherein
the first member includes a first surface and a second surface,
the second surface is between the second member and the first surface, and
the electrons are emitted from the first surface.

Configuration 6
The electron-emitting element according to any one of Configurations 1 to 5, wherein
the semiconductor member includes a polycrystal of the at least one selected from the group consisting of the first material, the second material, and the third material.

Configuration 7
The electron-emitting element according to any one of Configurations 1 to 6, wherein
the second member includes a polycrystal of diamond.

Configuration 8
The electron-emitting element according to any one of Configurations 1 to 7, wherein
a thickness of the first member along a first direction is 10 nm or less, and
the first direction is from the second member toward the first member.

Configuration 9
The electron-emitting element according to any one of Configurations 1 to 7, wherein
a thickness of the second member along a first direction is 30 nm or less, and
the first direction is from the second member toward the first member.

Configuration 10
The electron-emitting element according to any one of Configurations 1 to 9, wherein
the semiconductor member has polarization.

Configuration 11
The electron-emitting element according to any one of Configurations 1 to 10, further comprising:
a base body,
the second member being provided between the base body and the first member.

Configuration 12
The electron-emitting element according to any one of Configurations 1 to 11, wherein
the semiconductor member includes the first material, and the first material includes at least one of Mg, Zn, or C.

Configuration 13

The electron-emitting element according to any one of Configurations 1 to 11, wherein
the semiconductor member includes nitrogen and at least one selected from the group consisting of Al and Ga,
the semiconductor member includes a first region and a second region,
the second region is between the second member and the first region, and
a composition ratio of Al in the second region is greater than a composition ratio of Al in the first region.

Configuration 14

The electron-emitting element according to any one of Configurations 1 to 12, wherein
the second member contacts the first member.

Configuration 15

The electron-emitting element according to any one of Configurations 1 to 12, further comprising:
a third member,
the third member being provided between the second member and the first member,
the third member including SiC.

Configuration 16

The electron-emitting element according to any one of Configurations 1 to 12, further comprising:
a third member,
the third member being provided between the second member and the first member,
the semiconductor member including nitrogen and at least one selected from the group consisting of Al and Ga,
the third member including In, Ga, and nitrogen.

Configuration 17

The electron-emitting element according to any one of Configurations 1 to 16, wherein
the first member has an island configuration.

Configuration 18

The electron-emitting element according to any one of Configurations 1 to 17, further comprising:
a light emitter,
the second member being provided between the light emitter and the first member.

Configuration 19

The electron-emitting element according to Configuration 18, further comprising:
a fourth member,
the fourth member being light-transmissive and being between the light emitter and the second member.

Configuration 20

The electron-emitting element according to Configuration 19, wherein
the fourth member includes at least one selected from the group consisting of diamond and graphite,
the diamond member included in the second member includes at least one first element selected from the group consisting of B and Al, and
the diamond member included in the fourth member does not include the first element, or a concentration of the first element in the diamond member included in the fourth member is less than a concentration of the first element in the diamond member included in the second member.

Configuration 21

The electron-emitting element according to Configuration 1, wherein
the first member includes a first surface and a second surface,
the second surface is between the second member and the first surface,
light enters the second member from the first surface, and
electrons corresponding to the light are emitted from the first surface.

Configuration 22

The electron-emitting element according to Configuration 1, wherein
the first member includes a first surface and a second surface,
the second surface is between the second member and the first surface,
the second member includes a third surface and a fourth surface,
the third surface is between the fourth surface and the first member,
light enters the second member from the fourth surface, and
electrons corresponding to the light are emitted from the first surface.

According to the embodiments, an electron-emitting element can be provided in which the efficiency can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in electron-emitting elements such as first members, second members, third members, fourth members, base bodies, electrodes, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all electron-emitting elements practicable by an appropriate design modification by one skilled in the art based on the electron-emitting elements described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. An electron-emitting element, comprising:
a first member including a semiconductor member, the semiconductor member being of an n-type; and a second member including a diamond member, the diamond member being of a p-type and including at least one selected from the group consisting of diamond and graphite, the semiconductor member including at least one selected from the group consisting of a first material, a second material, and a third material, the first material including nitrogen and at least one selected from the group consisting of B, Al, In, and Ga, the second material including at least one selected from the group consisting of ZnO and ZnMgO, the third material including at least one selected from the group consisting of $BaTiO_3$, $PbTiO_3$, $Pb(Zr_x, Ti_{1-x})O_3$, $KNbO_3$, $LiNbO_3$, $LiTaO_3$, $Na_xWO_3$, $Zn_2O_3$, $Ba_2NaNb_5O_5$, $Pb_2KNb_5O_{15}$, and $Li_2B_4O_7$.

2. The electron-emitting element according to claim 1, wherein
electrons are emitted according to incident light entering to the electron-emitting element.

3. The electron-emitting element according to claim 2, wherein
a peak wavelength of the light is 300 nm or less.

4. The electron-emitting element according to claim 2, wherein
a peak wavelength of the light is 210 nm or less.

5. The electron-emitting element according to claim 2, wherein
the first member includes a first surface and a second surface,
the second surface is between the second member and the first surface, and
the electrons are emitted from the first surface.

6. The electron-emitting element according to claim 1, wherein
the semiconductor member includes a polycrystal of the at least one selected from the group consisting of the first material, the second material, and the third material.

7. The electron-emitting element according to claim 1, wherein
the second member includes a polycrystal of diamond.

8. The electron-emitting element according to claim 1, wherein
a thickness of the first member along a first direction is 10 nm or less, and
the first direction is from the second member toward the first member.

9. The electron-emitting element according to claim 1, wherein
a thickness of the second member along a first direction is 30 nm or less, and
the first direction is from the second member toward the first member.

10. The electron-emitting element according to claim 1, wherein
the semiconductor member has polarization.

11. The electron-emitting element according to claim 1, further comprising:
a base body,
the second member being provided between the base body and the first member.

12. The electron-emitting element according to claim 1, wherein
the semiconductor member includes the first material, and
the first material includes at least one of Mg, Zn, or C.

13. The electron-emitting element according to claim 1, wherein
the semiconductor member includes nitrogen and at least one selected from the group consisting of Al and Ga,
the semiconductor member includes a first region and a second region,
the second region is between the second member and the first region, and
a composition ratio of Al in the second region is greater than a composition ratio of Al in the first region.

14. The electron-emitting element according to claim 1, wherein
the second member contacts the first member.

15. The electron-emitting element according to claim 1, further comprising:
a third member,
the third member being provided between the second member and the first member,
the third member including SiC.

16. The electron-emitting element according to claim 1, further comprising:
a third member,
the third member being provided between the second member and the first member,
the semiconductor member including nitrogen and at least one selected from the group consisting of Al and Ga,
the third member including In, Ga, and nitrogen.

17. The electron-emitting element according to claim 1, wherein
the first member has an island configuration.

18. The electron-emitting element according to claim 1, further comprising:
a light emitter,
the second member being provided between the light emitter and the first member.

19. The electron-emitting element according to claim 18, further comprising:
a fourth member,
the fourth member being light-transmissive and being between the light emitter and the second member.

20. The electron-emitting element according to claim 19, wherein
the fourth member includes at least one selected from the group consisting of diamond and graphite,
the diamond member included in the second member includes at least one first element selected from the group consisting of B and Al, and
the diamond member included in the fourth member does not include the first element, or a concentration of the first element in the diamond member included in the fourth member is less than a concentration of the first element in the diamond member included in the second member.

* * * * *